US012393109B2

(12) United States Patent
Weng et al.

(10) Patent No.: US 12,393,109 B2
(45) Date of Patent: *Aug. 19, 2025

(54) GIMBAL CONTROL METHOD, GIMBAL, AND IMAGING DEVICE

(71) Applicant: SZ DJI TECHNOLOGY CO., LTD., Shenzhen (CN)

(72) Inventors: Songwei Weng, Shenzhen (CN); Qiyu Liang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,562

(22) Filed: May 20, 2024

(65) Prior Publication Data

US 2024/0302722 A1 Sep. 12, 2024

Related U.S. Application Data

(63) Continuation of application No. 17/513,274, filed on Oct. 28, 2021, now Pat. No. 11,988,946, which is a
(Continued)

(51) Int. Cl.
   *G03B 17/56* (2021.01)
   *F16M 11/12* (2006.01)
   (Continued)

(52) U.S. Cl.
   CPC ......... *G03B 17/561* (2013.01); *F16M 11/123* (2013.01); *G03B 17/08* (2013.01); *G03B 17/563* (2013.01); *H04N 23/51* (2023.01)

(58) Field of Classification Search
   None
   See application file for complete search history.

(56) References Cited

U.S. PATENT DOCUMENTS 11,988,946 B2 * 5/2024 Weng ................. H04N 23/52
2010/0321504 A1 12/2010 Miyamaki et al.
(Continued)

FOREIGN PATENT DOCUMENTS

CN    105223967 A    1/2016
CN    105554480 A    5/2016
(Continued)

OTHER PUBLICATIONS

The World Intellectual Property Organization (WIPO) International Search Report for PCT/CN2019/085011 Dec. 19, 2019 5 Pages (including translation).

*Primary Examiner* — Rodney E Fuller
(74) *Attorney, Agent, or Firm* — ANOVA LAW GROUP, PLLC

(57) ABSTRACT

A gimbal includes a gimbal assembly configured to mount an imaging device and drive the imaging device to rotate to adjust an imaging direction of the imaging device, at least one processor, and at least one memory including computer program code. The at least one memory and the computer program code are configured, with the at least one processor, to cause the gimbal to at least: obtain a current mode the gimbal has entered; and in response to the current mode the gimbal has entered being a preset mode, adjust a position of the gimbal assembly to an equilibrium position in the preset mode, to cause the imaging direction of the imaging device to face a specific direction.

20 Claims, 5 Drawing Sheets

Related U.S. Application Data continuation of application No. PCT/CN2019/085011, filed on Apr. 29, 2019.

(51) Int. Cl.
*G03B 17/08* (2021.01)
*H04N 23/51* (2023.01)

(56) References Cited

U.S. PATENT DOCUMENTS

| | | |
|---|---|---|
| 2019/0178436 A1 | 6/2019 | Mao et al. |
| 2021/0120179 A1 | 4/2021 | Liu et al. |

FOREIGN PATENT DOCUMENTS

| | | | |
|---|---|---|---|
| CN | 107352038 | A | 11/2017 |
| CN | 107466385 | A | 12/2017 |
| CN | 107735643 | A | 2/2018 |
| CN | 107786802 | A | 3/2018 |
| CN | 108476288 | A | 8/2018 |
| CN | 208670494 | U | 3/2019 |
| EP | 3376756 | A1 | 9/2018 |

\* cited by examiner

GIMBAL CONTROL METHOD, GIMBAL, AND IMAGING DEVICE

CROSS-REFERENCE TO RELATED APPLICATIONS

This application is a continuation of application Ser. No. 17/513,274, filed on Oct. 28, 2021, which is a continuation of International Application No. PCT/CN2019/085011, filed on Apr. 29, 2019, the entire contents of both of which are incorporated herein by reference.

TECHNICAL FIELD

The present disclosure relates to the technical field of image acquisition technology and, more specifically, to a gimbal control method, a gimbal, and an imaging device.

BACKGROUND

When a gimbal camera is in certain shooting scenes, in order to place the target completely in the camera's imaging field of view, or to prevent the camera's imaging field of view from being blocked, the orientation of the gimbal camera needs to be adjusted. In conventional technology, the adjustment of the orientation of the gimbal camera is generally achieved by retuning the gimbal to the center through manual operation by the user, which is not an efficient process.

SUMMARY

One aspect of the present disclosure provides a method for controlling a gimbal, implemented by a gimbal controller. The gimbal includes a gimbal assembly connected to the gimbal controller, the gimbal assembly being configured to mount an imaging device and drive the imaging device to rotate to adjust an imaging direction of the imaging device. The method includes determining whether the gimbal has entered a preset mode; and controlling rotation of the gimbal assembly to stabilize the imaging direction of the imaging device at a first balance direction when the gimbal enters the preset mode, and controlling a movement of the gimbal assembly such that the imaging direction of the imaging device is within a first cone angle range with the first balance direction as an axis before the gimbal exiting the preset mode.

Another aspect of the present disclosure provides a method for controlling a gimbal, implemented by a gimbal controller. The gimbal including a gimbal assembly connected to the gimbal controller, the gimbal assembly being configured to mount an imaging device and drive the imaging device to rotate to adjust an imaging direction of the imaging device. The method includes determining whether the gimbal has entered a preset mode; and adjusting an attitude of the gimbal assembly to a specific attitude such that the imaging direction of the installed imaging device faces a specific direction when the gimbal enters the preset mode, and controlling the attitude of the gimbal assembly such that an imaging field of view of the imaging device does not exceed a first cone angle range before the gimbal exiting the preset mode.

Another aspect of the present disclosure provides a gimbal. The gimbal includes a gimbal controller, including a memory connected to a processor through a communication bus; and a gimbal assembly connected to the gimbal controller, the gimbal assembly being configured to mount an imaging device and drive the imaging device to rotate to adjust an imaging direction of the imaging device. The memory is configured to store program instructions that, when being executed by the processor, cause the processor to determine whether the gimbal has entered a preset mode; and control a rotation of the gimbal assembly to stabilize the imaging direction of the imaging device at a first balance direction when the gimbal enters the preset mode, and control a movement of the gimbal assembly such that the imaging direction of the imaging device is within a first cone angle range with the first balance direction as an axis before the gimbal exiting the preset mode.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

When a gimbal camera is in certain shooting scenes, in order to place the target to be imaged completely in the camera's imaging field of view, or to prevent the camera's imaging field of view from being blocked, the orientation of the gimbal camera needs to be adjusted. In addition, conventional gimbals lack waterproof accessories for underwater imaging, therefore, conventional gimbals do not have the issue of adapting to waterproof accessories. In conventional technology, the adjustment of the orientation of the gimbal camera is generally achieved by retuning the gimbal to the center through manual operation by the user, which is inefficiency. Accordingly, embodiments of the present disclosure provide a gimbal control method, a gimbal, and an imaging device.

Figure 1:
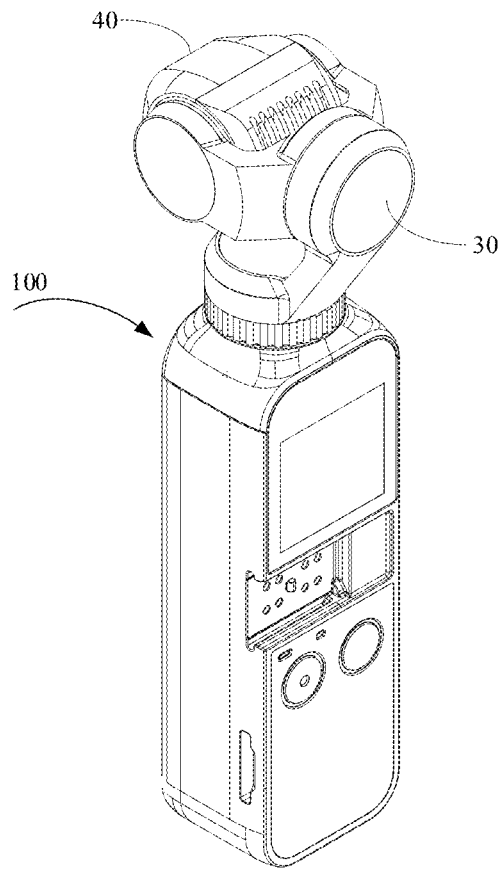
FIG. 1 is a schematic structural diagram of a gimbal according to an embodiment of the present disclosure.

FIG. 1 is a schematic structural diagram of a gimbal according to an embodiment of the present disclosure. As shown in FIG. 1, the structure of a gimbal 100 includes a gimbal assembly 30, which can be used to mount an imaging device 40 and drive the imaging device 40 to rotate, thereby adjusting the imaging direction of the imaging device 40. In some embodiments, the imaging device can be a camera. The gimbal may further include a gimbal controller (not shown in the drawings). The gimbal controller may be connected to the gimbal assembly 30 in a communicative manner for controlling the rotation of the gimbal assembly 30.

Figure 2:
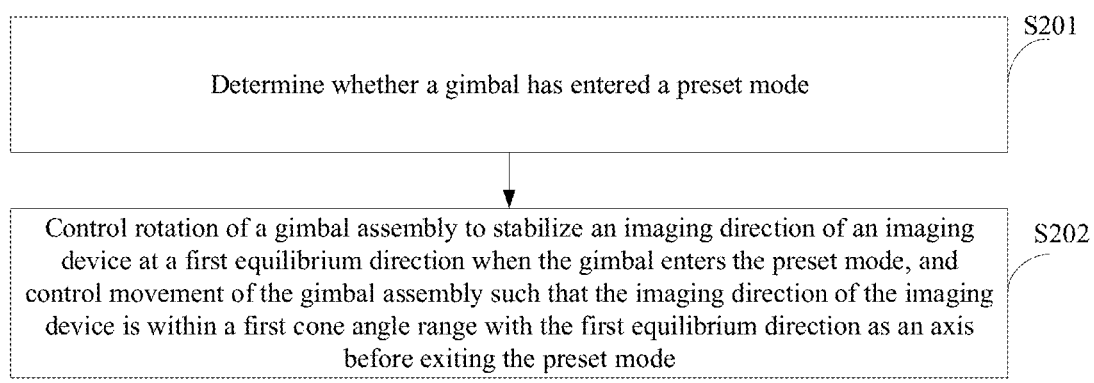
FIG. 2 is a flowchart of a gimbal control method according to an embodiment of the present disclosure.

FIG. 2 is a flowchart of a gimbal control method for controlling a gimbal according to an embodiment of the present disclosure. The method can be applied to the gimbal controller described above. The method will be described in detail below.

S201, determining whether the gimbal has entered a preset mode.

For example, the preset mode may be a mode that meets a specific shooting scene, such as a diving mode, a raining mode, or a fixed-angle shooting mode. The diving mode may be suitable for the specific working mode of underwater shooting scenes. The raining mode may be suitable for rainy, snowy, waterfalls, rafting, and other scenes that require waterproofing. In the diving mode and the raining mode, the gimbal may need to be equipped with a waterproof cover. The fixed-angle shooting mode may be suitable for scenes where the gimbal is shot upward or downward form a non-horizontal angle.

S202, controlling rotation of the gimbal assembly to stabilize the imaging direction of the imaging device at a first balance direction when the gimbal enters the preset mode, and controlling movements of the gimbal assembly such that the imaging direction of the imaging device is within a first cone angle range with the first balance direction as an axis before exiting the preset mode.

In some embodiments, a reset trigger module that executes in this mode may also be provided. In response to the user's reset operation, the gimbal may drive the imaging device to return to the first balance direction and maintain this direction until a new instruction is received from the gimbal controller.

When the gimbal ins in an underwater mode or the raining mode, a waterproof housing may need to be installed, such that the gimbal can be covered by the waterproof cover to be waterproofed.

Figure 3:
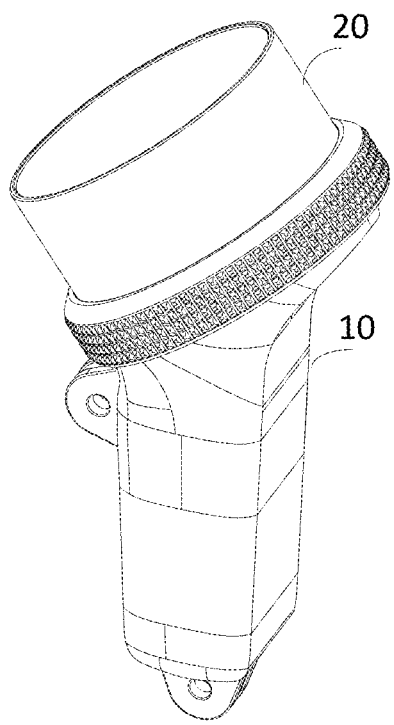
FIG. 3 is a schematic structural diagram of a waterproof device according to an embodiment of the present disclosure.

FIG. 3 is a schematic diagram of a waterproof housing. As shown in FIG. 3, the waterproof housing includes a housing 10 and a transparent waterproof cover 20. An opening adapted to the shape of an opening of the transparent waterproof cover 20 may be disposed at one end of the housing 10, and the two openings may abut against each other. In addition, the housing 10 and the transparent waterproof cover 20 may be locked to each other to form a sealed cavity, and one or more installation components for installing the gimbal may be disposed in the sealed cavity. Further, a movement space for the gimbal may be provided in the cavity.

The transparent waterproof cover described above may be assembled with the gimbal assembly to play a waterproof role for the installed imaging device. The transparent waterproof cover is generally circular, and in order to avoid glare, the transparent waterproof cover may be generally arranged in a plane shape.

When the gimbal works underwater or in the rain, if a waterproof housing is installed, the structure of the waterproof housing may interfere with the rotation range of the gimbal. If contact with the waterproof housing occurs during the rotation of the gimbal assembly, the gimbal stopper can be easily triggered, which will cause the gimbal assembly to be locked. When the gimbal is locked, the gimbal needs to be removed from the waterproof housing to restore the gimbal from the locked state. Therefore, in order for the gimbal to work normally in the waterproof housing and to take a complete image, the rotation range of the gimbal assembly needs to be limited.

On the other hand, since the arc or round light incident surface can cause serious glare, the transparent waterproof cover may adapt the planar structure. When the imaging angle exceeds the range of the planar structure, the curved part of the housing can cause glare and serious aberrations.

Therefore, the rotation range of the gimbal assembly needs to be limited.

In some embodiments, considering the gripping characteristics of the human body, in the diving mode, the human may be in a suspended state in water. Therefore, the light incident surface of the waterproof housing may be designed to have an angle with the horizontal plane, such that the holding and shooting style of the user will be similar to holding a flashlight, which is more in line with the body movement habits when floating or in suspension. In this mode, in order to ensure that the gimbal's shooting range is compatible with the horizontal light-incident surface of the waterproof housing, the gimbal needs to have a new equilibrium position. When the imaging device is in the new equilibrium position, its imaging direction may be perpendicular to the light incident surface of the waterproof housing, which is a better position. The advantages of this position include ease of performing optical calibration and optical adjustment in this mode, ease of performing first person view (FPV) mode in this position, and ease of following the angle of view or the position in a symmetrical manner in the follow mode since the equilibrium position is at the center of the incident plane. In some embodiments, the control system of the gimbal may be a closed loop control system, which may be based on the Jacobian matrix, and the position of the gimbal may be obtained by the position parameters fed back by the three-axis drive motor of the gimbal.

Figure 4:
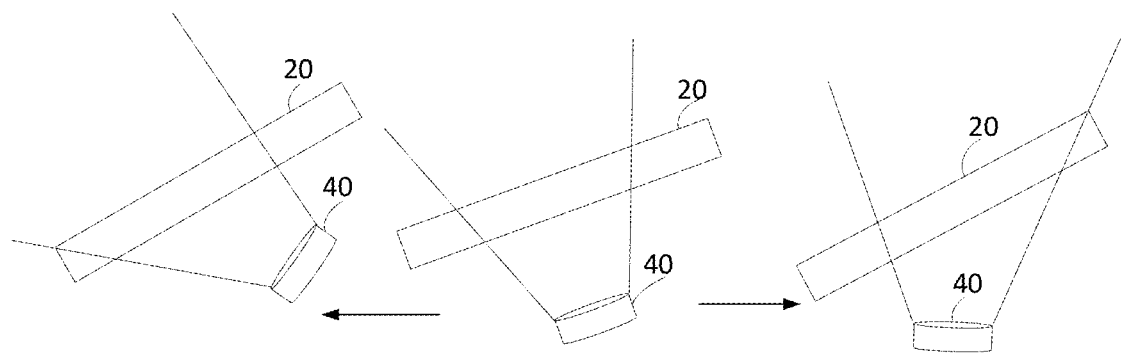
FIG. 4 is a relationship diagram between an imaging device and a transparent waterproof cover according to an embodiment of the present disclosure.

As shown in FIG. 4, when the light exiting surface of the transparent waterproof cover is flat and the lens of the imaging device is at a center position 3, the imaging field of view will be blocked. When the lens deflection of the imaging device exceeds a first deflection position 1 and a second deflection position 2, the imaging field of view of the lens will be blocked by the frame of the waterproof cover. Therefore, the imaging field of view of the imaging device needs to be limited within a cone angle range.

Figure 5:
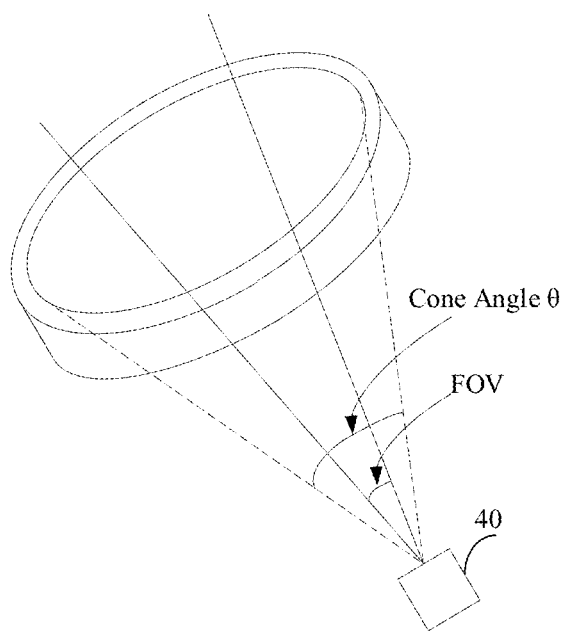
FIG. 5 is a schematic diagram of a cone angle according to an embodiment of the present disclosure.

Referring to FIG. 5, in order to adapt the imaging device 40 to the waterproof housing described above, the FOV of the imaging device needs to be limited within the cone angle θ range described above. The cone angle θ may take the imaging device as the apex and the horizontal light incident surface of the waterproof cover as the bottom surface.

Further, in the embodiments of the present disclosure, after the gimbal enters the preset mode, the gimbal controller may control the rotation of the gimbal assembly, such that the imaging direction of the imaging device can be stabilized at the first balance direction. The first balance direction may be the corresponding direction when the imaging device described above is at the center position. In addition, before exiting the preset mode, the movement of the gimbal assembly may be controlled, such that the imaging direction of the imaging device is within the range of the first cone angle range with the first balance direction as the axis. In this way, the imaging direction of the imaging device mounted on the gimbal assembly can be limited to a certain range to adapt to the shooting scene in the preset mode, the gimbal assembly can be prevented from contacting the waterproof housing, and the imaging field of the imaging device can be prevented from being blocked by the frame of the transparent waterproof cover.

In some embodiments, in the process at S201, determining whether the gimbal has entered the preset mode may include determining that the gimbal has entered the preset mode in response to receiving a first user instruction; otherwise, determining that the gimbal has not entered the preset mode.

In some embodiments, the first user instruction may be an instruction to enter the preset mode, which may be triggered by a user's operation. For example, the user may click on the preset mode on an application interface of an external terminal device connected to the gimbal to trigger the external terminal device to generate a first user instruction, and send the first user instruction to the gimbal controller. In another example, the user may trigger the gimbal to generate the first user instruction by selecting the preset mode on a display screen of the gimbal. Alternatively, when the gimbal in installed in the waterproof housing, the user may trigger the generation of the first user instruction through a function key on the waterproof housing.

In some embodiments, in the process at S201, determining whether the gimbal has entered the preset mode may include identifying the position of a designated device of the gimbal; and, determining that the gimbal has entered the preset mode in response to identifying that the position is a configured position indicating that the designated device has been installed on the gimbal; otherwise, determining that the gimbal has not entered the preset mode.

In some embodiments, for a gimbal that requires an external device to be installed in a special shooting scene, the gimbal controller may determine whether to enter the preset mode by determining whether the external device has been installed in a designated position.

Figure 6:
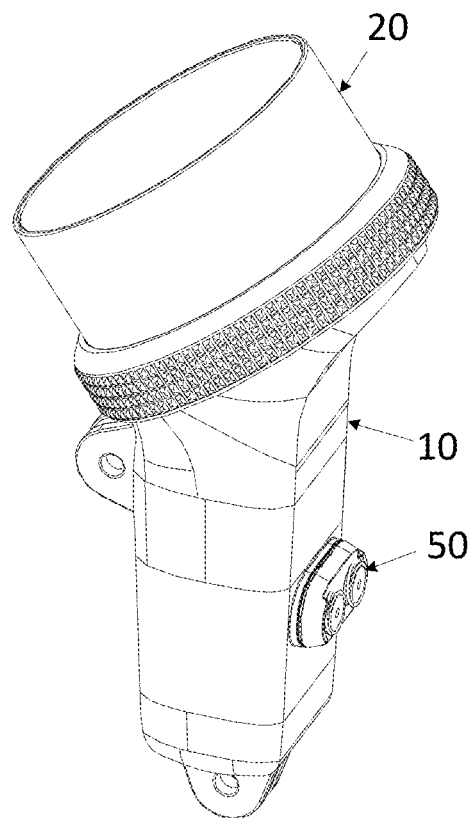
FIG. 6 is a schematic structural diagram of another waterproof device according to an embodiment of the present disclosure.

The external device may include a waterproof device, such as a waterproof housing. For example, as shown in FIG. 6, the waterproof housing described above includes a button 50. The designated position may be the position corresponding to the button, and the detection of whether the button is installed in place may be realized by using a sensor.

For example, when the gimbal is shooting underwater, an external waterproof device may need to be installed. If the fixing part of the waterproof device for locking the gimbal has been installed to the corresponding position of the gimbal, the gimbal can be determined as being in the diving mode. It should be noted that the technical solutions provided in the present disclosure do not require the gimbal to be matched with the waterproof housing. The gimbal may also implement the preset mode separately to achieve the corresponding technical effects. For example, the gimbal may be placed on the ground, and the equilibrium position of the imaging device may be directed to a certain angle through the motor control of the gimbal assembly, thereby achieving tracking of a specific area.

In some embodiments, in the process at S202, controlling the rotation of the gimbal assembly to stabilize the imaging direction of the imaging device at the first balance direction may include controlling a pitch axis motor to adjust its rotation angle to a first preset angle by sending a first control instruction to the pitch axis motor of the gimbal.

In this embodiment, the gimbal assembly may move under the traction of the pitch axis motor, and the gimbal controller may send a first control instruction to the pitch axis motor of the gimbal to control the pitch axis motor to adjust the rotation angle to the first preset angle.

In some embodiments, the first preset angle may be any angle between 30° to 60°.

In some embodiments, the first preset angle may be 45°. In this case, the pitch angle of the gimbal assembly when it is stabilized in the first balance direction may be 45°.

In some embodiments, the gimbal controller may also adjust the yaw angle and the pitch angle of the gimbal assembly by controlling the yaw axis motor and the pitch axis motor. In this case, controlling the rotation of the gimbal assembly to stabilize the imaging direction of the imaging device at the first balance direction may include the gimbal controller controlling the yaw axis motor and the pitch axis motor to adjust their perspective rotation angles within a certain range by sending the first control instructions to the yaw axis motor and the pitch axis motor of the gimbal, respectively.

In some embodiments, the yaw axis motor and pitch axis motor may be controlled to adjust their perspective rotation angles to 0°.

In some embodiments, the first balance direction may be the direction of the designated component, and the designated component may be disposed on the designated device.

In some embodiments, the designated component may be a transparent waterproof cover, and the designated device may be a waterproof device.

An embodiment of the present disclosure provides another gimbal control method, which can be applied to the gimbal controller described above. The gimbal may include a gimbal assembly, and the gimbal assembly may be connected to the gimbal controller. The gimbal assembly may be configured to mount the imaging device and drive the imaging device to rotate, thereby adjusting the imaging direction of the imaging device. The gimbal control method may include determining whether the gimbal has entered a preset mode; and, controlling the rotation of the gimbal assembly, such that the imaging direction of the imaging device is stabilized at the first balance direction when the gimbal enters the preset mode.

In some embodiments, after adjusting the rotation of the gimbal assembly such that the imaging direction of the imaging device is stabilized at the first balance direction, the gimbal assembly may be locked until a condition for ending the lock is met and detected.

In this embodiment, the gimbal assembly can be locked until it is detected that the condition for ending the lock is met, which can prevent the gimbal assembly from rotating around the roll axis again during the shooting in the preset mode, which can cause the orientation of the imaging device to deviate.

In some embodiments, detecting whether the condition for ending the lock is met may include detecting whether a second user instruction is received, and if so, determining that the condition for ending the lock is met.

In some embodiments, the second user instruction may be an instruction to exit the preset mode, and the second user instruction may be generated by a user's operation. For example, the user may click on the application interface of the external terminal device connected to the gimbal to exit the preset mode or switch to another mode, trigger the external terminal device to generate the second user instruction, and send the second user instruction to the gimbal controller. Alternatively, the user may trigger the gimbal to generate the second user instruction by clicking on the display screen of the gimbal to exit the preset mode or switch to another mode. Or, when the waterproof housing is installed, the generation of the second user instruction may be triggered by pressing a function key on the waterproof housing.

In some embodiments, detecting whether the condition for ending the lock is met may include identifying the position of the designated device of the gimbal; and, determining that the condition for ending the lock is met in response to identifying that the designated device is separated from the configured position indicating that the designated device has been installed on the gimbal.

In some embodiments, the designated device may include the waterproof device.

Figure 7:
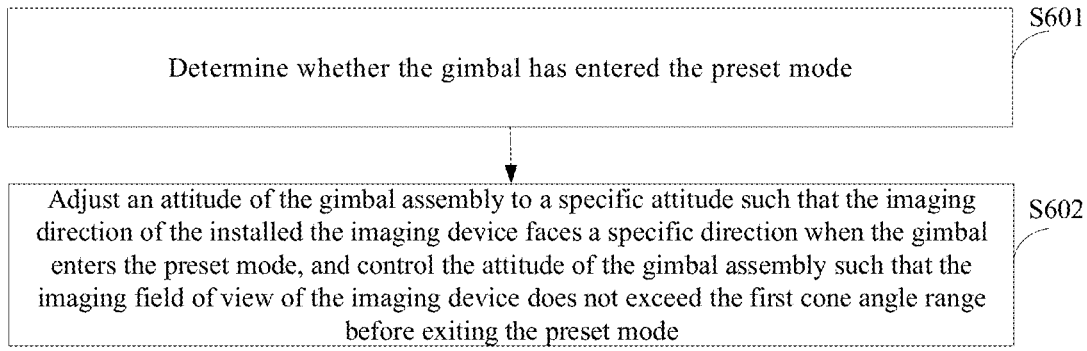
FIG. 7 is a flowchart of another gimbal control method according to an embodiment of the present disclosure.

FIG. 7 is a flowchart of another gimbal control method according to an embodiment of the present disclosure. The gimbal control method can be applied to the gimbal controller described above. The method will be described in detail below.

S601, determining whether the gimbal has entered a preset mode.

In this embodiment, when the gimbal is in the preset mode, the attitude of the gimbal assembly of the gimbal may need to be maintained at a specific attitude.

For example, the preset mode may be a sports mode. For example, when the gimbal is bound to a bicycle for riding, the gimbal assembly may need to be directed toward the direction of the object being shot. In another example, the preset mode may be the diving shooting mode or the raining shooting mode. When the gimbal is working underwater or in the rain, a waterproof housing may need to be installed. In order to adapt the imaging device to the exit range of the transparent lens cover of the waterproof housing, the attitude of the gimbal assembly may also need to be adjusted.

In some embodiments, in the process at S601, determining whether the gimbal has entered the preset mode may include determining that the gimbal has entered the preset mode in response to receiving a first user instruction; otherwise, determining that the gimbal has not entered the preset mode.

In some embodiments, the first user instruction may be an instruction to enter the preset mode, which may be triggered by a user's operation. For example, the user may click on the preset mode on the application interface of an external terminal device connected to the gimbal to trigger the external terminal device to generate a first user instruction, and send the first user instruction to the gimbal controller. In another example, the user may trigger the gimbal to generate the first user instruction by selecting the preset mode on a display screen of the gimbal. Alternatively, when the gimbal in installed in the waterproof housing, the generation of the first user instruction may be triggered by pressing the function key on the waterproof housing.

In some embodiments, in the process at S601, determining whether the gimbal has entered the preset mode may include identifying the position of a designated device of the gimbal; and, determining that the gimbal has entered the preset mode in response to identifying that the position is a configured position indicating that the designated device has been installed on the gimbal; otherwise, determining that the gimbal has not entered the preset mode.

In this embodiment, for a gimbal that requires an external device to be installed in a special shooting scene, the gimbal controller may determine whether to enter the preset mode by determining whether the external device has been installed in a designated position.

For example, when shooting underwater and an external waterproof device needs to be installed, whether the fixing part of the waterproof device for locking the gimbal has been installed in place needs to be determined. If the fixing part of the waterproof device is in place, the gimbal may be determined as being in the preset mode. In some embodiments, the determination may be made by using a sensor.

S602, adjusting the attitude of the gimbal assembly to a specific attitude such that the imaging direction of the installed the imaging device faces a specific direction when the gimbal enters the preset mode, and controlling the attitude of the gimbal assembly such that the imaging field of view of the imaging device does not exceed the first cone angle range before exiting the preset mode.

In this embodiment, after determining that the gimbal enters the preset mode, the gimbal controller may adjust the attitude of the gimbal assembly to a specific attitude. In this specific attitude, the lens of the imaging device mounted on the gimbal assembly can face a specific direction.

In some embodiments, the specific direction may be a direction of the designated component, and designated component may be disposed on the designated device.

In some embodiments, the designated component may be a transparent waterproof cover, and the designated device may be a waterproof device.

When shooting in a rainy or underwater environment, a gimbal imaging device without waterproof function needs to be equipped with a waterproof device such as a waterproof housing. However, due to the limitation of the waterproof housing when the imaging device is shooting, when the orientation of the gimbal is deviated, the image captured by the imaging device may include the frame of the waterproof housing, which reduces the quality of the captured image and reduces the user experience. In this embodiment, by adjusting the attitude of the gimbal assembly to a specific attitude, the lens of the imaging device mounted on the gimbal assembly can be directed toward the direction of the transparent waterproof cover, thereby avoiding the imaging angle of view of the imaging device from being blocked.

In some embodiments, in the process at S602, adjusting the attitude of the gimbal assembly to a specific attitude may include adjusting the pitch attitude of the gimbal assembly to a specific pitch attitude.

In some embodiments, the pitch angle of the gimbal assembly may be adjusted within the range of 30° to 60°.

In some embodiments, the pitch angle of the gimbal assembly may be adjusted to 45°. In some embodiments, adjusting the attitude of the gimbal assembly to a specific attitude may include adjusting the roll attitude, yaw attitude, and pitch attitude of the gimbal assembly to a specific roll attitude, a specific yaw attitude, and a specific pitch attitude, respectively.

For example, the yaw angle and roll angle of the gimbal assembly may be adjusted to 0°, and the pitch angle may be adjusted to 45°.

In some embodiments, after adjusting the attitude of the gimbal assembly to a specific attitude, the attitude of the gimbal assembly may be locked until a condition for ending the lock is met and detected.

In this embodiment, after adjusting the attitude of the gimbal assembly to a specific attitude, the current attitude of the gimbal assembly may be locked until a condition for ending the lock is met and detected, thereby avoiding the attitude of the gimbal assembly from changing again during the shooting in the preset mode, which can cause the orientation of the imaging device to deviate. Maintaining the gimbal assembly in a specific attitude can ensure that the imaging field of view of the imaging device is not blocked.

In some embodiments, detecting whether the condition for ending the lock is met may include detecting whether a second user instruction is received, and if so, determining that the condition for ending the lock is met.

In some embodiments, the second user instruction may be an instruction to exit the preset mode, and the second user instruction may be generated by a user's operation. For example, the user may click on the application interface of the external terminal device connected to the gimbal to exit the preset mode or switch to another mode, trigger the external terminal device to generate the second user instruction, and send the second user instruction to the gimbal controller. Alternatively, the user may trigger the gimbal to generate the second user instruction by clicking on the display screen of the gimbal to exit the preset mode or switch to another mode. Or, when the waterproof housing is installed, the generation of the second user instruction may be triggered by pressing a function key on the waterproof housing.

In some embodiments, detecting whether the condition for ending the lock is met may include identifying the position of the designated device of the gimbal; and, determining that the condition for ending the lock is met in response to identifying that the designated device is separated from the configured position indicating that the designated device has been installed on the gimbal.

In some embodiments, the designated device may include the waterproof device.

For example, in a gimbal equipped with a waterproof device, if the fixing part of the waterproof device for locking the gimbal has deviated from the corresponding position, the gimbal can be determined as ending the diving mode. In some embodiments, the position can be determined by using a sensor.

Figure 8:
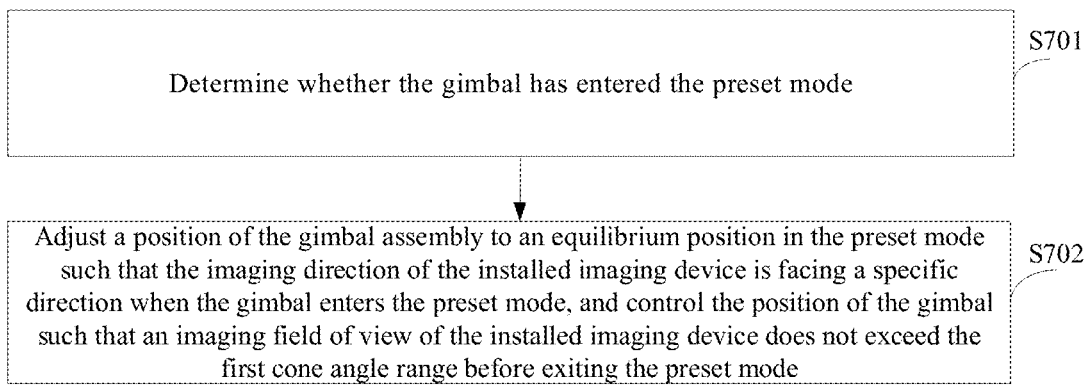
FIG. 8 is a flowchart of another gimbal control method according to an embodiment of the present disclosure.

FIG. 8 is a flowchart of another gimbal control method according to an embodiment of the present disclosure. The gimbal control method can be applied to the gimbal controller described above. The method will be described in detail below.

S701, determining whether the gimbal has entered a preset mode.

For example, the preset mode may be a sports mode. For example, when the gimbal is bound to a bicycle for riding, the gimbal assembly may need to be directed toward the direction of the object being shot. In another example, the preset mode may be the diving shooting mode or the raining shooting mode. When the gimbal is working underwater or in the rain, a waterproof housing may need to be installed. In order to adapt the imaging field of view of the imaging device to the exit range of the transparent cover of the waterproof housing, the orientation of the imaging device may need to be adjusted to the same direction as the transparent cover.

In some embodiments, in the process at S701, determining whether the gimbal has entered the preset mode may include determining that the gimbal has entered the preset mode in response to receiving a first user instruction; otherwise, determining that the gimbal has not entered the preset mode.

In some embodiments, the first user instruction may be an instruction to enter the preset mode, which may be triggered by a user's operation. For example, the user may click on the preset mode on the application interface of an external terminal device connected to the gimbal to trigger the external terminal device to generate a first user instruction, and send the first user instruction to the gimbal controller. In another example, the user may trigger the gimbal to generate the first user instruction by selecting the preset mode on a display screen of the gimbal. Alternatively, when the gimbal in installed in the waterproof housing, the generation of the first user instruction may be triggered by pressing the function key on the waterproof housing.

In some embodiments, in the process at S701, determining whether the gimbal has entered the preset mode may include identifying the position of a designated device of the gimbal; and, determining that the gimbal has entered the preset mode in response to identifying that the position is a configured position indicating that the designated device has been installed on the gimbal; otherwise, determining that the gimbal has not entered the preset mode.

In this embodiment, for a gimbal that requires an external device to be installed in a special shooting scene, the gimbal controller may determine whether to enter the preset mode by determining whether the external device is installed in place.

For example, when shooting underwater and an external waterproof device needs to be installed, whether the fixing part of the waterproof device for locking the gimbal has been installed in the corresponding position needs to be determined. If the fixing part of the waterproof device is in the corresponding position, the gimbal may be determined as being in the diving mode. In some embodiments, the determination may be made by using a sensor.

S702, adjusting the position of the gimbal assembly to an equilibrium position in the preset mode such that the imaging direction of the installed imaging device is facing a specific direction when the gimbal enters the preset mode, and controlling the position of the gimbal such that the imaging field of view of the installed imaging device does not exceed the first cone angle range before exiting the preset mode.

In this embodiment, after determining that the gimbal has entered the preset mode, the gimbal controller may adjust the position of the gimbal assembly to the equilibrium position in the preset mode, such that the lens of the imaging device mounted on the gimbal assembly can face a specific direction.

Further, after entering the preset mode, the equilibrium position of the gimbal assembly may change, and the gimbal controller may adjust the position of the gimbal assembly to the equilibrium position in the preset mode.

In some embodiments, the specific direction may be a direction of the designated component, and designated component may be disposed on the designated device.

In some embodiments, the designated component may be a transparent waterproof cover, and the designated device may be a waterproof device.

When shooting in a rainy or underwater environment, a gimbal imaging device without waterproof function needs to be equipped with a waterproof housing. However, due to the limitation of the waterproof housing when the imaging device is shooting, when the orientation of the gimbal is deviated, the image captured by the imaging device may include the frame of the waterproof housing, which reduces the quality of the captured image and reduces the user experience. In this embodiment, by adjusting the position of the gimbal assembly to the equilibrium position, the lens of the imaging device mounted on the gimbal assembly can be directed toward the direction of the transparent waterproof cover, thereby avoiding the imaging angle of view of the imaging device from being blocked.

In some embodiments, adjusting the position of the gimbal assembly to the equilibrium position may include adjusting the pitch angle of the gimbal assembly such that the position of the gimbal assembly is at the equilibrium position in the preset mode.

In this embodiment, by adjusting the pitch angle of the gimbal assembly, the position of the gimbal assembly can be at the equilibrium position in the preset mode. In some embodiments, adjusting the pitch angle of the gimbal assembly such that the position of the gimbal assembly is at the equilibrium position in the preset mode may include adjusting the pitch angle of the gimbal assembly to any angle within the range of 30° to 60° such that the position of the gimbal assembly is at the equilibrium position in the preset mode.

In some embodiments, the pitch angle of the gimbal assembly may be adjusted to 45°.

In some embodiments, adjusting the position of the gimbal assembly to the equilibrium position in the preset mode may include adjusting the roll angle, yaw angle, and pitch angle of the gimbal assembly such that the position of the gimbal assembly is at the equilibrium position in the preset mode.

In some embodiments, the roll angle and the yaw angle of the gimbal assembly may be adjusted to 0°, and the pitch angle of the gimbal assembly may be adjusted to 45°.

In some embodiments, when the position of the gimbal assembly is at the equilibrium position in the preset mode, the orientation of the lens of the imaging device mounted on the gimbal assembly may be consistent with the orientation of the exit surface of the designated component. In some embodiments, the designated component may be a transparent waterproof cover.

In some embodiments, after adjusting the position of the gimbal assembly to the equilibrium position, the position of the gimbal assembly may be locked until the condition for ending the lock is met and detected.

In some embodiments, after adjusting the position of the gimbal assembly to the equilibrium position, the current position of the gimbal assembly may be locked until the condition for ending the lock is met and detected, thereby preventing the gimbal assembly from deviating from the equilibrium position during shooting in the preset mode.

In some embodiments, detecting whether the condition for ending the lock is met may include detecting whether a second user instruction is received, and if so, determining that the condition for ending the lock is met.

In some embodiments, the second user instruction may be an instruction to exit the preset mode, and the second user instruction may be generated by a user's operation. For example, the user may click on the application interface of the external terminal device connected to the gimbal to exit the preset mode or switch to another mode, trigger the external terminal device to generate the second user instruction, and send the second user instruction to the gimbal controller. Alternatively, the user may trigger the gimbal to generate the second user instruction by clicking on the display screen of the gimbal to exit the preset mode or switch to another mode. Or, when the waterproof housing is installed, the generation of the second user instruction may be triggered by pressing a function key on the waterproof housing.

In some embodiments, detecting the condition to end the lock is met may include identifying a position of a designated waterproof device of the gimbal; and, determining that the condition for ending the lock is met in response to identifying that the designated waterproof device is separated from the configured position for indicating that the designated waterproof device has been installed on the gimbal.

In some embodiments, the designated device may include the waterproof device.

Figure 9:
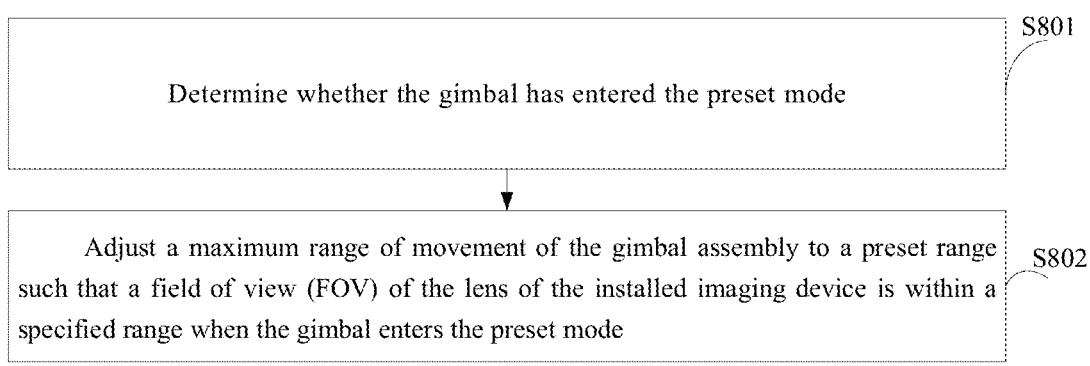
FIG. 9 is a flowchart of another gimbal control method according to an embodiment of the present disclosure.

FIG. 9 is a flowchart of another gimbal control method according to an embodiment of the present disclosure. The gimbal control method can be applied to the gimbal controller described above. The method will be described in detail below.

S801, determining whether the gimbal has entered a preset mode.

For example, the preset mode may be the diving shooting mode or the raining shooting mode. When the gimbal is working underwater or in the rain, a waterproof housing may need to be installed. In order to adapt the imaging field of view of the imaging device to the exit range of the transparent cover of the waterproof housing, the orientation of the imaging device may need to be adjusted to the same direction as the transparent cover to prevent the imaging field of view of the imaging device from being blocked.

In some embodiments, in the process at S801, determining whether the gimbal has entered the preset mode may include determining that the gimbal has entered the preset mode in response to receiving a first user instruction; otherwise, determining that the gimbal has not entered the preset mode.

In some embodiments, the first user instruction may be an instruction to enter the preset mode, which may be triggered by a user's operation. For example, the user may click on the preset mode on the application interface of an external terminal device connected to the gimbal to trigger the external terminal device to generate a first user instruction, and send the first user instruction to the gimbal controller. In another example, the user may trigger the gimbal to generate the first user instruction by selecting the preset mode on a display screen of the gimbal. Alternatively, when the gimbal in installed in the waterproof housing, the generation of the first user instruction may be triggered by pressing the function key on the waterproof housing.

In some embodiments, in the process at S801, determining whether the gimbal has entered the preset mode may include identifying the position of a designated device of the gimbal; and, determining that the gimbal has entered the preset mode in response to identifying that the position is a configured position indicating that the designated device has been installed on the gimbal; otherwise, determining that the gimbal has not entered the preset mode.

In some embodiments, for a gimbal that requires an external device to be installed in a special shooting scene, the gimbal controller may determine whether to enter the preset mode by determining whether the external device has been installed in a designated position.

For example, when the gimbal is shooting underwater, an external waterproof device may need to be installed. If the fixing part of the waterproof device for locking the gimbal has been installed to the corresponding position of the gimbal, the gimbal can be determined as being in the diving mode. In some embodiments, the detection of the position may be achieved by using a sensor.

S802, adjusting a maximum range of movement of the gimbal assembly to a preset range such that the field of view (FOV) of the lens of the installed imaging device is within a specified range when the gimbal enters the preset mode.

In some embodiments, after determining that the gimbal has entered the preset mode, the gimbal controller may adjust the maximum movement range of the gimbal assembly to the preset range, such that the FOV of the lens of the imaging device mounted on the gimbal assembly can be within the specified range.

In some embodiments, in the process at S802, adjusting the maximum movement range of the gimbal assembly to the preset range may include adjusting the maximum angle range of the position of the gimbal assembly deviating from the equilibrium position in the preset mode to a second preset angle range.

After the gimbal assembly enters the preset mode, the equilibrium position may change. By adjusting the position of the gimbal assembly to deviate from the maximum angle range of the equilibrium position, the orientation of the gimbal assembly can be restricted, and the lens orientation of the imaging device mounted on the gimbal assembly can be restricted within the specified range, thereby avoiding the imaging field of view of the imaging device from being blocked, or ensuring that the imaging device can capture a complete image of the target subject.

In some embodiments, the specified range may be the exit range of the exit surface of the designated assembly.

In some embodiments, the designated assembly may be a transparent waterproof cover, and the transparent waterproof cover may be disposed on the waterproof device.

In some embodiments, adjusting the maximum angle range of the position of the gimbal assembly deviating from the equilibrium position in the preset mode to the second preset angle range may include adjusting the maximum adjustable roll angle of the gimbal assembly to be within a preset threshold range.

For example, if the roll angle of the gimbal assembly is 45° at the equilibrium position in the preset mode, the maximum adjustable roll angle of the gimbal assembly may be set to be within the range of 0° to 15°.

In some embodiments, after adjusting the maximum movement range of the gimbal assembly to a preset range, the movement range of the gimbal assembly may be locked within the preset range until a condition for ending the lock is met and detected.

In some embodiments, detecting whether the condition for ending the lock is met may include detecting whether a second user instruction is received, and if so, determining that the condition for ending the lock is met.

In some embodiments, the second user instruction may be an instruction to exit the preset mode, and the second user instruction may be generated by a user's operation. For example, the user may click on the application interface of the external terminal device connected to the gimbal to exit the preset mode or switch to another mode, trigger the external terminal device to generate the second user instruction, and send the second user instruction to the gimbal controller. Alternatively, the user may trigger the gimbal to generate the second user instruction by clicking on the display screen of the gimbal to exit the preset mode or switch to another mode. Or, when the waterproof housing is installed, the generation of the second user instruction may be triggered by pressing a function key on the waterproof housing.

In some embodiments, detecting whether the condition for ending the lock is met may include identifying the position of the designated device of the gimbal; and, determining that the condition for ending the lock is met in response to identifying that the designated device is separated from the configured position indicating that the designated device has been installed on the gimbal.

In some embodiments, the designated device may include the waterproof device.

For example, in a gimbal equipped with a waterproof device, if the fixing part of the waterproof device for locking the gimbal has deviated from the corresponding position, the gimbal can be determined as ending the diving mode. In some embodiments, the position can be determined by using a sensor.

An embodiment of the present disclosure also provides a gimbal. The gimbal may include a gimbal controller and a gimbal assembly. The gimbal controller may be connected to the gimbal assembly, and the gimbal assembly may be configured to mount an imaging device and drive the imaging device to rotate, thereby adjusting the imaging direction of the imaging device. The gimbal controller may include a memory and a processor. The memory can be connected to the processor through a communication bus, and configured to store program instructions. The processor can be configured to execute the program instructions stored in the memory. When executed by the processor, the program instructions can cause the processor to determine whether the gimbal has entered the preset mode; and, control the rotation of the gimbal assembly to stabilize the imaging direction of the imaging device at a first balance direction when the gimbal enters the preset mode, and control the movement of the gimbal assembly such that the imaging direction of the imaging device is within a first cone angle range with the first balance direction as an axis before exiting the preset mode.

In some embodiments, the program instructions may further cause the processor to determine that the gimbal has entered in the preset mode in response to receiving a first user instruction; otherwise, determine that the gimbal has not entered the preset mode.

In some embodiments, the program instructions may further cause the processor to identify a position of a designated device of the gimbal; and, determine that the gimbal has entered the preset mode in response to identifying that the position is a configured position indicating that the designated device has been installed on the gimbal; otherwise, determine that the gimbal has not entered the preset mode.

In some embodiments, the designated device may include a waterproof device.

In some embodiments, the program instructions may further cause the processor to control a pitch axis motor to adjust its rotation angle to a first preset angle by sending a first control instruction to the pitch axis motor of the gimbal.

In some embodiments, the first preset angle may be any angle between 30° to 60°.

In some embodiments, the designated direction may be the direction of the designated assembly, and the designated assembly may be disposed on the designated device.

In some embodiments, the designated assembly may be a transparent waterproof cover.

An embodiment of the present disclosure further provides a gimbal. The gimbal may include a gimbal controller and a gimbal assembly. The gimbal controller may be connected to the gimbal assembly, and the gimbal assembly may be configured to mount an imaging device and drive the imaging device to rotate, thereby adjusting the imaging direction of the imaging device. The gimbal controller may include a memory and a processor. The memory can be connected to the processor through a communication bus, and configured to store program instructions. The processor can be configured to execute the program instructions stored in the memory. When executed by the processor, the program instructions can cause the processor to determine whether the gimbal has entered the preset mode, and control the rotation of the gimbal assembly to stabilize the imaging direction of the imaging device at the first balance direction when the gimbal enters the preset mode.

An embodiment of the present disclosure further provides a gimbal. The gimbal may include a gimbal controller and a gimbal assembly. The gimbal controller may be connected to the gimbal assembly, and the gimbal assembly may be configured to mount an imaging device and drive the imaging device to rotate, thereby adjusting the imaging direction of the imaging device. The gimbal controller may include a memory and a processor. The memory can be connected to the processor through a communication bus, and configured to store program instructions. The processor can be configured to execute the program instructions stored in the memory. When executed by the processor, the program instructions can cause the processor to determine whether the gimbal has entered the preset mode; and, adjust the attitude of the gimbal assembly to a specific attitude such that the imaging direction of the installed the imaging device faces a specific direction when the gimbal enters the preset mode, and control the attitude of the gimbal assembly such that the imaging field of view of the imaging device does not exceed the first cone angle range before exiting the preset mode.

In some embodiments, the program instructions may further cause the processor to determine that the gimbal has entered the preset mode in response to receiving a first user instruction; otherwise, determine that the gimbal has not entered the preset mode.

In some embodiments, the program instructions may further cause the processor to identify a position of a designated device of the gimbal; and, determine that the gimbal has entered the preset mode in response to identifying that the position is a configured position indicating that the designated device has been installed on the gimbal; otherwise, determine that the gimbal has not entered the preset mode.

In some embodiments, the designated device may include a waterproof device.

In some embodiments, the program instructions may further cause the processor to adjust the pitch attitude of the gimbal assembly to a specific pitch attitude.

In some embodiments, the program instructions may further cause the processor to adjust the pitch angle of the gimbal assembly to any angle from 30° to 60°.

In some embodiments, the program instructions may further cause the processor to adjust the roll attitude, yaw attitude, and pitch attitude of the gimbal assembly to a specific roll attitude, a specific yaw attitude, and a specific pitch attitude, respectively.

In some embodiments, the designated direction may be the direction of the designated assembly, and the designated assembly may be disposed on the designated device.

In some embodiments, the designated assembly may be a transparent waterproof cover.

An embodiment of the present disclosure further provides a gimbal. The gimbal may include a gimbal controller and a gimbal assembly. The gimbal controller may be connected to the gimbal assembly, and the gimbal assembly may be configured to mount an imaging device and drive the imaging device to rotate, thereby adjusting the imaging direction of the imaging device. The gimbal controller may include a memory and a processor. The memory can be connected to the processor through a communication bus, and configured to store program instructions. The processor can be configured to execute the program instructions stored in the memory. When executed by the processor, the program instructions can cause the processor to determine whether the gimbal has entered the preset mode; and, adjust the position of the gimbal assembly to an equilibrium position in the preset mode such that the imaging direction of the installed imaging device is facing a specific direction when the gimbal enters the preset mode, and control the position of the gimbal such that the imaging field of view of the installed imaging device does not exceed the first cone angle range before exiting the preset mode.

In some embodiments, the motors that control the gimbal may include a yaw axis motor, a pitch axis motor, and a roll axis motor. Through the position from the position sensor of the motor in the gimbal assembly, and by input the position parameters into the Jacobian matrix, the orientation of the gimbal in each mode can be controlled. The first equilibrium position may be achieved by controlling the control parameters to control the roll axis motor of the gimbal to drive the imaging device to rotate upward by an angle, such that the imaging direction of the imaging device can form an angle with the horizontal plane. The angle may be between 30° to 60°, but other angles are not excluded. For example, the first equilibrium position may be the position after the roll axis is rotated by 90°, and the orientation of the imaging device and the gimbal may be substantially in a straight line.

In the first equilibrium position, through the control of the motor, the gimbal may move around the equilibrium position in the FPV mode and the follow mode. The movement in the FPV mode and the follow mode may be related to the attitude of the gimbal. The attitude information can be obtained through the attitude sensor of the gimbal, which can feed the attitude of the gimbal back to the gimbal control system, and completes the parameter conversion from the Cartesian coordinate system to the four-element coordinate system in the process. Subsequently, complementary filtering can be performed to solve the possible errors and drifts of the continuously moving gimbal, and the position and attitude of the gimbal can be expressed through a four-element cosine matrix. Then, the Jacobian matrix can be used to perform PID control on the gimbal's next action. Considering the need to control the actual position of the gimbal to constrain the shooting within a cone with the imaging device as the vertex and the constrained area as the bottom surface, the parameters of the Jacobian matrix can be constrained such that the movement of the gimbal will not exceed the preset area.

In some embodiments, the program instructions may further cause the processor to determine that the gimbal has entered the preset mode in response to receiving a first user instruction; otherwise, determine that the gimbal has not entered the preset mode.

In some embodiments, the program instructions may further cause the processor to identify a position of a designated device of the gimbal; and, determine that the gimbal has entered the preset mode in response to identifying that the position is a configured position indicating that the designated device has been installed on the gimbal; otherwise, determine that the gimbal has not entered the preset mode.

In some embodiments, the designated device may include a waterproof device.

In some embodiments, the program instructions may further cause the processor to adjust the pitch angle of the gimbal assembly such that the position of the gimbal assembly is at the equilibrium position in the preset mode.

In some embodiments, the program instructions may further cause the processor to adjust the pitch angle of the gimbal assembly to any angle within the range of 30° to 60° such that the position of the gimbal assembly is at the equilibrium position in the preset mode In some embodiments, the program instructions may further cause the processor to adjust the roll angle, yaw angle, and pitch angle of the gimbal assembly such that the position of the gimbal assembly is at the equilibrium position in the preset mode.

In some embodiments, the designated direction may be the direction of the designated assembly, and the designated assembly may be disposed on the designated device.

In some embodiments, when the gimbal assembly is in the equilibrium position, the imaging direction of the imaging device mounted on the gimbal assembly may be consistent with the direction of the exit surface of the designated assembly.

In some embodiments, the designated assembly may be a transparent waterproof cover.

An embodiment of the present disclosure further provides a gimbal. The gimbal may include a gimbal controller and a gimbal assembly. The gimbal controller may be connected to the gimbal assembly, and the gimbal assembly may be configured to mount an imaging device and drive the imaging device to rotate, thereby adjusting the imaging direction of the imaging device. The gimbal controller may include a memory and a processor. The memory can be connected to the processor through a communication bus, and configured to store program instructions. The processor can be configured to execute the program instructions stored in the memory. When executed by the processor, the program instructions can cause the processor to determine whether the gimbal has entered the preset mode; and, adjust a maximum range of movement of the gimbal assembly to a preset range such that the field of view (FOV) of the lens of the installed imaging device is within a specified range when the gimbal enters the preset mode.

In some embodiments, the program instructions may further cause the processor to determine that the gimbal has entered the preset mode in response to receiving a first user instruction; otherwise, determine that the gimbal has not entered the preset mode.

In some embodiments, the program instructions may further cause the processor to identify a position of a designated device of the gimbal; and, determine that the gimbal has entered the preset mode in response to identifying that the position is a configured position indicating that the designated device has been installed on the gimbal; otherwise, determine that the gimbal has not entered the preset mode.

In some embodiments, the designated device may include a waterproof device.

In some embodiments, the program instructions may further cause the processor to adjust the maximum angle range of the position of the gimbal assembly deviating from the equilibrium position in the preset mode to a second preset angle range.

In some embodiments, the program instructions may further cause the processor to adjust the maximum adjustable roll angle of the gimbal assembly to be within a preset threshold range.

In some embodiments, the specified range may be the exit range of the exit surface of the designated assembly.

In some embodiments, the designated assembly may be a transparent waterproof cover.

In some embodiments, the gimbal may be detachably installed inside the waterproof device. The waterproof device may include a designated assembly, and a movement space for the handheld gimbal may be provided within the waterproof device.

An embodiment of the present disclosure further provides an imaging device, which can be installed on the gimbal described above.

Figure 10:
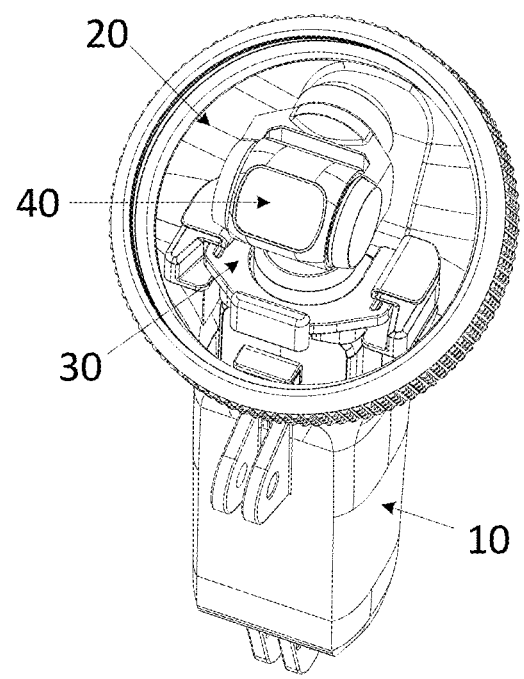
FIG. 10 is a schematic structural diagram of the imaging device according to an embodiment of the present disclosure.

FIG. 10 is a schematic structural diagram of an imaging device according to an embodiment of the present disclosure. As shown in FIG. 10, a gimbal assembly 30 of the imaging device is installed inside the waterproof device, and the waterproof device is the waterproof housing 10. The handheld gimbal is installed inside the waterproof housing 10, and an imaging device 40 is mounted on the gimbal assembly 30. The gimbal assembly and the imaging device are installed in the transparent waterproof cover 20.

In some embodiments, the imaging device may be configured to detect the lighting conditions in the current shooting scene, and adjust the white balance of the images captured by the imaging device based on the lighting conditions.

For example, in an underwater shooting scene, the lack of red light will cause the white balance of the captured image to be blue, and the color temperature of the actual scene cannot be obtained. In this embodiment, in order to adapt to the underwater shooting scene, the imaging device may automatically detect the lighting conditions in the current shooting scene, and adjust the white balance of the images captured by the imaging device based on the lighting conditions to obtain more realistic images.

In some embodiments, the imaging device may adjust the white balance by increasing the gain to adjust the color temperature in response to detecting that one or more of the red light gain, blue light gain, and green light gain in the current shooting scene is lower than a preset value.

In some embodiments, when the imaging device is shooting an underwater scene, in order to ensure that the images captured by the imaging device will not have excessive blue cast due to the lack of red light, in response to detecting that the red light gain in the current shooting scene is lower than a preset value, the color temperature value may be adjusted to a preset color temperature range to improve the quality of the images taken underwater.

Since the apparatus embodiment basically corresponds to the method embodiment, for related information, reference may be made to the description in the method embodiment. The described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. A person of ordinary skill in the art may understand and implement the embodiments of the present invention without creative efforts.

It should be noted that in the present disclosure, relational terms such as first and second, etc., are only used to distinguish an entity or operation from another entity or operation, and do not necessarily imply that there is an actual relationship or order between the entities or operations. The terms "comprising," "including," or any other variations are intended to encompass non-exclusive inclusion, such that a process, a method, an apparatus, or a device having a plurality of listed items not only includes these items, but also includes other items that are not listed, or includes items inherent in the process, method, apparatus, or device. Without further limitations, an item modified by a term "comprising a . . . " does not exclude inclusion of another same item in the process, method, apparatus, or device that includes the item.

The method and apparatus provided in embodiments of the present disclosure have been described in detail above. In the present disclosure, particular examples are used to explain the principle and embodiments of the present disclosure, and the above description of embodiments is merely intended to facilitate understanding the methods in the embodiments of the disclosure and concept thereof; meanwhile, it is apparent to persons skilled in the art that changes can be made to the particular implementation and application scope of the present disclosure based on the concept of the embodiments of the disclosure, in view of the above, the contents of the specification shall not be considered as a limitation to the present disclosure.

What is claimed is:

1. A gimbal comprising:
a gimbal assembly configured to mount an imaging device and drive the imaging device to rotate to adjust an imaging direction of the imaging device;
at least one processor; and
at least one memory including computer program code, wherein the at least one memory and the computer program code are configured, with the at least one processor, to cause the gimbal to at least:
obtain a current mode the gimbal has entered; and
in response to the current mode the gimbal has entered being a preset mode, adjust a position of the gimbal assembly to an equilibrium position in the preset mode, to cause the imaging direction of the imaging device to face a specific direction.

2. The gimbal of claim 1, wherein the at least one memory and the computer program code are further configured, with the at least one processor, to cause the gimbal to at least:
control the position of the gimbal assembly to cause an imaging field of view of the imaging device to not exceed a first cone angle range before the gimbal exits the preset mode.

3. The gimbal of claim 1, wherein to obtain the current mode the gimbal has entered, the at least one memory and the computer program code are further configured, with the at least one processor, to cause the gimbal to at least:
in response to receiving a first user instruction, determine that the current mode the gimbal has entered is the preset mode; or
identify a position of a designated device of the gimbal, and determine that the current mode the gimbal has entered is the preset mode in response to identifying that the position of the designated device is a configured position indicating that the designated device has been installed on the gimbal.

4. The gimbal of claim 3, wherein:
the designated device includes a waterproof device.

5. The gimbal of claim 4, wherein:
the gimbal is detachably installed inside the waterproof device, the waterproof device including a designated assembly; and
a movement space for the gimbal is provided within the waterproof device.

6. The gimbal of claim 3, wherein:
the specific direction is a direction of a designated assembly, and the designated assembly is disposed on the designated device.

7. The gimbal of claim 6, wherein:
in response to the gimbal assembly being located at the equilibrium position, the imaging direction of the imaging device on the gimbal assembly is consistent with an orientation of an exit surface of the designated assembly.

8. The gimbal of claim 6, wherein:
the designated assembly is a transparent waterproof cover.

9. The gimbal of claim 1, wherein to adjust the position of the gimbal assembly to the equilibrium position in the preset mode, the at least one memory and the computer program code are further configured, with the at least one processor, to cause the gimbal to at least:
adjust a pitch attitude of the gimbal assembly to cause the position of the gimbal assembly to be at the equilibrium position in the preset mode.

10. The gimbal of claim 9, wherein to adjust the pitch attitude of the gimbal assembly to cause the position of the gimbal assembly to be at the equilibrium position in the preset mode, the at least one memory and the computer program code are further configured, with the at least one processor, to cause the gimbal to at least:
adjust a pitch angle of the gimbal assembly to an angle between 30° to 60°, to cause the position of the gimbal assembly to be at the equilibrium position in the preset mode.

11. The gimbal of claim 1, wherein to adjust the position of the gimbal assembly to the equilibrium position in the preset mode, the at least one memory and the computer program code are further configured, with the at least one processor, to cause the gimbal to at least:
adjust a roll attitude, a yaw attitude, and a pitch attitude of the gimbal assembly to cause the position of the gimbal assembly to be at the equilibrium position in the preset mode.

12. A gimbal comprising:
a gimbal assembly configured to mount an imaging device and drive the imaging device to rotate to adjust an imaging direction of the imaging device;
at least one processor; and
at least one memory including computer program code, wherein the at least one memory and the computer program code are configured, with the at least one processor, to cause the gimbal to at least:
obtain a current mode the gimbal has entered; and
in response to the current mode the gimbal has entered being a preset mode, adjust a maximum range of movement of the gimbal assembly to a preset range, to cause a field of view of a lens of the imaging device to be within a specific range.

13. The gimbal of claim 12, wherein to obtain the current mode the gimbal has entered, the at least one memory and the computer program code are further configured, with the at least one processor, to cause the gimbal to at least:
in response to receiving a first user instruction, determine that the current mode the gimbal has entered is the preset mode; or identify a position of a designated device of the gimbal, and determine that the current mode the gimbal has entered is the preset mode in response to identifying that the position of the designed device is a configured position indicating that the designated device has been installed on the gimbal.

14. The gimbal of claim 13, wherein:
the designated device includes a waterproof device.

15. The gimbal of claim 12, wherein to adjust the maximum range of movement of the gimbal assembly to the preset range, the at least one memory and the computer program code are further configured, with the at least one processor, to cause the gimbal to at least:
adjust a maximum angle range of a position of the gimbal assembly deviating from an equilibrium position in the preset mode to a preset angle range.

16. The gimbal of claim 15, wherein to adjust the maximum angle range of the position of the gimbal assembly deviating from the equilibrium position in the preset mode to the preset angle range, the at least one memory and the computer program code are further configured, with the at least one processor, to cause the gimbal to at least:
adjust a maximum adjustable roll angle of the gimbal assembly to be within a preset threshold range.

17. The gimbal of claim 12, wherein:
the specified range is an exit range of an exit surface of a designated assembly.

18. The gimbal of claim 17, wherein:
the designated assembly is a transparent waterproof cover.

19. A method for controlling a gimbal, the gimbal including a gimbal assembly configured to mount an imaging device and drive the imaging device to rotate to adjust an imaging direction of the imaging device, the method comprising:
obtaining a current mode the gimbal has entered; and
in response to the current mode the gimbal has entered being a preset mode, adjusting a position of the gimbal assembly to an equilibrium position in the preset mode, to cause the imaging direction of the imaging device to face a specific direction.

20. The method of claim 19, further comprising:
controlling the position of the gimbal assembly to cause an imaging field of view of the imaging device to not exceed a first cone angle range before the gimbal exits the preset mode.

* * * * *